United States Patent Office 2,956,922
Patented Oct. 18, 1960

2,956,922
PROTECTION OF GROWING PLANTS

John D. Garber, Cranford, and Harold C. Reynolds, Plainfield, N.J., assignors to Merck & Co., Inc., Rahway, N.J., a corporation of New Jersey No Drawing. Filed Dec. 5, 1955, Ser. No. 550,807

9 Claims. (Cl. 167—42)

This invention relates to plant preservation and protection and particularly to the preservation and protection of growing plants from infectious organisms.

Recenlty there has been an increasing interest in the possible applications of antibiotics for the control of plant diseases. This is due to the unavailability of really satisfactory measures for the control of bacterial blight and certain fungus diseases. It has been discovered that streptomycin drastically reduces fire blight infections on apple and pear trees when applied as a spray or dust five times during the blossoming season in concentrations of from 30 to 500 parts per million. The effectiveness of streptomycin against the walnut blight organism has shown promise as a prebloom spray or dust at a concentration of about ten parts per million. Typical of diseases which are treated are bacterial canker, fire blight of pears and apples, bacterial canker of tomato plants, bacterial spot of tomato and pepper plants, black leg and soft-rot in potatoes, grain diseases such as rusts, Panama disease of banana, tobacco blue mold, wild fire of tobacco and halo blight of beans. Streptomycin up to the present time is the most universally useful antibiotic for the protection of plants against a large range of infectious organisms.

There are, however, two definite deterrents to the widespread application of antibiotics to diseases in the plant kingdom. The most important deterrent to the commercial grower is the cost factor. The cost has been somewhat reduced by the use of crude antibiotics, thereby eliminating expensive purification procedures, but even with this expedient the cost still remains high. The second deterrent is the nature of the application of the antibiotics. When the antibiotics are sprayed or dusted on the plants there is a definite time element involved in the absorption of antibiotic materials into the plant tissues. Rain is a great hazard since any rain shortly after application will wash away the antibiotic materials. In regions where heavy dews are prevalent the application of antibiotic material is greatly hindered for the same reason. These hazards materially affect the protection of the plants, since it is essential in the use of antibiotics to have them continually present during infectious periods. In the case of fruit trees the infectious or critical time is during the blossom period. The antibiotic is applied to the trees several times during this blossom period to provide continual protection of the trees. The occurrence, therefore, of frequent rains and heavy dews makes the maintenance of this desired condition impossible. Because of these hazards, the use of antibiotics for the protection of plants by commercial growers and farmers has not been widely adopted as the price of the material is such that it cannot be used economically in commercial practice.

It was reported in Plant Disease Reporter 37, page 404 (1953), that better results were obtained than with streptomycin alone when the streptomycin was absorbed on an ion exchange resin of the phenol-formaldehyde type and that impregnation of bentonite dust gave equally good results. The effectiveness of such absorbents was believed to be due to the antibiotic being strongly bound to the absorbent and only slowly liberated in the presence of moisture. This belief is pointed out in Diamond Walnut News, vol. 35, No. 3 (May 1953).

An object of the invention is to reduce or eliminate serious losses in commercial plants caused by the destructive effect of infectious organisms. Another object is to provide a protective composition for treating plants which is rapidly absorbed into the plant system. A further object is to provide a commercially practical method of preserving and protecting growing plants from infectious organisms. Other objects and the advantages of the invention will appear hereinafter.

These objects are accomplished in accordance with the invention by applying to plants a composition comprising a combination of streptomycin and a clay which has a pH in concentrated aqueous solutions of less than 9, and which contains no more than a trace of montmorillonite, beidellite or hallorpite. Such clays are kaolins, illites, attapulgites, pyrophyllites, sub-bentonites and diatomaceous earth. This composition allows rapid adsorption of the streptomycin into the leaf structure, blossom or even bark, thereby eliminating the hazard of rain or heavy dew in agricultural application. This particular group of clays which are effective in the compositions of this invention are those to which the streptomycin is only loosely bound and readily released to the plant. This type of composition is in contrast to the materials heretofore used which were chosen on the belief that the streptomycin has to be strongly adsorbed. Clays such as montmorillonites and bentonites of the swellable type, as well as talc are of the strong adsorbent type and give inferior results as compared to the compositions of this invention.

The usual range of streptomycin concentration in the dusting composition is from 0.001 to 1% and preferably from 0.01 to 0.2%. In using crude streptomycin or one of its salts the weight used for calculations is the weight based on activity of the base rather than on the actual weight of the crude material. The streptomycin is preferably used in the form of a non-toxic active salt such as the hydrochloride, nitrate, sulfate or calcium chloride complex salts. The reference to streptomycin herein is intended to include both streptomycin and such salts.

The streptomycin is absorbed on the clay by intimately admixing the clay and streptomycin together. This can be accomplished by placing the two components in a container and agitating the container. Alternately this admixing can be accomplished by dissolving the streptomycin in water or another solvent and charging the solution onto a moving bed of clay and then drying and pulverizing the dried material. A preferred method of preparing the composition of the invention is to intimately mix together about 1 to 20 parts of the clay with each part of streptomycin. This concentrate can then be subsequently admixed with additional carrier to dilute the percentage of streptomycin to 0.001 to 1% of the total composition. This second mixing can conveniently be carried out by the ultimate user of the composition.

The addition of an adjunct is sometimes desirable to give the composition some particular desirable characteristic. Typical of such agents are anti-caking agents, stabilizing agents, reducing agents, coloring agents and the like.

Suitable anti-caking agents are crystalline water-insoluble inorganic magnesium salts such as magnesium oxide, magnesium carbonate, magnesium pyrophosphate, magnesium aluminate and ammonium magnesium phosphate, calcium carbonate, starch, calcium phosphate, calcium chloride, silicon dioxide, vegetable dust and insoluble soap such as magnesium stearate, manganese stearate, magnesium palmitate, calcium palmitate and zinc stearate. The anti-caking agent is usually present in from 0.5 to 2%. Suitable reducing agents which can be mentioned are bisulfites, sulfoxylates, thiosulfates, thiodipropionic acid, thioglycerol and thioglucose. Suitable stabilizing agents are combinations of an acid salt with thiodipropionic acid, sodium salt of sulfurous or hydrosulfurous acid and sodium formaldehyde sulfoxylate.

The compositions of this invention are conveniently prepared by mixing the particular clay having the streptomycin loosely adsorbed with additional amounts of clays or other carriers which do not have to be the same as the adsorbent. It is important in controlling any of the infectious organisms in this manner to maintain the concentration of antibiotic within the plant at a high level during the infectious period. As an example, in the case of fruit trees such as the Bartlett pear, the infectious period is during the blossoming. The trees should, therefore, be dusted three, four, five or more times during this period, depending on the length of the blossom season. A typical good treatment for Bartlett pears is the application of a dust containing 0.5% of streptomycin four or five times during the blossom period at approximately seven-day intervals.

The following examples are given for the purpose of illustration:

Example 1

Approximately 27.8 pounds of water was charged into a ten-gallon stainless steel can. Approximately 27.8 pounds of streptomycin sulfate (54% streptomycin activity) is added to the water and the mixture agitated until all the streptomycin has dissolved. Approximately 122.2 pounds of pyrophyllite was charged to a coating pan and the streptomycin solution pumped at five to ten pounds per square inch pressure through a 0.062 Sprayco nozzle onto the spinning carrier. After all the solution was charged the wetted carrier was dried at 40° C. for a period of 36 to 48 hours. The dried adsorbate was then micro-pulverized to pass through a 1/32 inch screen. The pulverized material was then mixed in a blender for fifteen minutes. The product consisted of 150 pounds of a 10% adsorbate of streptomycin sulfate on pyrophyllite.

A 500 p.p.m. streptomycin dust was prepared by blending five pounds of the 10% streptomycin base with 995 pounds of additional pyrophyllite carrier.

Example 2

Approximately 13.9 pounds of water was charged into a ten-gallon strainless steel can. Approximately 13.9 pounds of streptomycin sulfate (54% streptomycin activity) is added to the water and the mixture agitated until all the streptomycin has dissolved. Approximately 61.1 pounds of diatomaceous earth was charged to a coating pan and the streptomycin solution pumped at five to ten pounds per square inch pressure through a 0.062 Sprayco nozzle onto the spinning carrier. After all the solution was charged the wetted carrier was dried at 40° C. for a period of 36 to 48 hours. The dried adsorbate was then micro-pulverized to pass through a 1/32 inch screen. The pulverized material was then mixed in a blender for fifteen minutes. The product consisted of 75 pounds of a 10% adsorbate of streptomycin sulfate on diatomaceous earth.

A 500 p.p.m. streptomycin dust was prepared by blending five pounds of the 10% streptomycin base with 995 pounds of additional diatomaceous earth carrier.

Example 3

Approximately 1.85 pounds of streptomycin sulfate (54% streptomycin activity) and 998.15 pounds of pyrophyllite was blended for one hour in a Ribbon blender. The product consisted of 1,000 pounds of a 0.1% blend of streptomycin sulfate on pyrophyllite.

Example 4

Approximately 0.463 pound of streptomycin sulfate (54% streptomycin activity) and 500 pounds of diatomaceous earth was blended for one hour in a Ribbon blender. The product consisted of 500 pounds of a 0.05% blend of streptomycin sulfate on diatomaceous earth.

Example 5

A block of pear trees was treated with two dusts prepared by blending a pyrophyllite diluent with two forms of streptomycin (a) 10% streptomycin absorbed on swellable bentonite and (b) 10% streptomycin absorbed on Attapulgus clay. Three applications at 30 to 40 pounds of dust per acre were made during the critical bloom period. After one month the following disease readings were taken:

| Type of Streptomycin | Final Conc., p.p.m. | Blighted Twigs Per Tree |
|---|---|---|
| Bentonite Adsorbate | 250 | 4.0 |
| Clay Adsorbate | 250 | 2.4 |

Any departure from the above description which conforms to the present invention is intended to be included within the scope of the claims.

What is claimed is:

1. A composition useful for the protection of plants against infectious organisms upon dilution with an inert carrier that comprises a dry blend of streptomycin and a clay selected from the group consisting of kaolins, illites, attapulgites, pyrophyllites, sub-bentonites and diatomaceous earth and containing from 1 to 20 parts by weight of clay per part of streptomycin.

2. The composition of claim 1 wherein the streptomycin is present as streptomycin sulfate.

3. A composition useful for the protection of plants against infectious organisms upon dilution with an inert carrier that comprises a dry blend of streptomycin sulfate in diatomaceous earth and containing from 1 to 20 parts by weight of diatomaceous earth per part of streptomycin sulfate.

4. A composition useful for the protection of plants against infectious organisms upon dilution with an inert carrier that comprises a dry blend of streptomycin sulfate in pyrophyllite and containing from 1 to 20 parts by weight of pyrophyllite per part of streptomycin sulfate.

5. A composition useful for protecting plants against infectious organisms that comprises a dry blend of streptomycin and a clay selected from the group consisting of kaolins, illites, attapulgites, pyrophyllites, sub-bentonites and diatomaceous earth, said composition containing 0.001% to 1.0% by weight of streptomycin.

6. A composition useful for protecting plants against infectious organisms that comprises a dry blend of streptomycin sulfate and diatomaceous earth, said blend containing from 0.001% to 1.0% by weight of streptomycin sulfate.

7. A composition useful for protecting plants against infectious organisms that comprises a dry blend of streptomycin sulfate and pyrophyllite, said blend containing from 0.001% to 1.0% by weight of streptomycin sulfate.

8. A composition useful for protecting plants against infectious organisms that comprises a dry blend of streptomycin and a clay selected from the group consisting of kaolins, illites, attapulgites, pyrophyllites, sub-bentonites and diatomaceous earth, said composition containing 0.01% to 0.2% by weight of streptomycin.

9. A composition useful for protecting plants against infectious organisms that comprises a dry blend of streptomycin sulfate and diatomaceous earth, said blend containing from 0.01% to 0.2% by weight of streptomycin sulfate.

References Cited in the file of this patent

UNITED STATES PATENTS

| | | |
|---|---|---|
| 2,793,974 | Rosen | May 28, 1957 |
| 2,801,950 | Tate | Aug. 6, 1957 |

OTHER REFERENCES

Henry et al.: Control of Covered Smut, Science, Jan. 25, 1952, pp. 90 and 91.

Manuf. Chemist, "Agricultural Antibiotics," May 1955, p. 195.

Zaumeyer: "Control of Halo Blight of Beans With Streptomycin," Absts. of Papers, 124th meeting of the ACS, Sept. 6–11, 1953, p. 29A.

Ark: "Use of Streptomycin Dust to Control Fire Blight," Plant Disease Reporter, July 15, 1953, vol. 37, No. 7, pp. 404–406.

Ark: "Experiments With Streptomycin for Walnut Blight Control," Diamond Walnut News, May 1955, vol. 35, No. 3, page 6.